United States Patent
Bergman

(10) Patent No.: US 6,758,497 B2
(45) Date of Patent: Jul. 6, 2004

(54) FUEL TANK FOR A STRADDLE-MOUNTED VEHICLE

(75) Inventor: Ron Bergman, McIntosh, MN (US)

(73) Assignee: Arctic Cat Inc., Thief River Falls, MN (US)

( * ) Notice: Subject to any disclaimer, the term of this patent is extended or adjusted under 35 U.S.C. 154(b) by 52 days.

(21) Appl. No.: 10/134,719

(22) Filed: Apr. 29, 2002

(65) Prior Publication Data

US 2003/0201637 A1 Oct. 30, 2003

(51) Int. Cl.[7] ................................. B60P 3/22
(52) U.S. Cl. .................. 280/833; 280/834; 180/183
(58) Field of Search .................. 180/182, 183, 180/184, 186, 190; 280/830, 833, 834, 835; D12/110; 220/562

(56) References Cited

U.S. PATENT DOCUMENTS

| | | | | |
|---|---|---|---|---|
| 4,178,955 A | * | 12/1979 | Dau | 137/264 |
| 4,234,050 A | * | 11/1980 | Condon | 180/190 |
| 4,469,256 A | * | 9/1984 | McEwen | 224/413 |
| 5,040,632 A | * | 8/1991 | Fujii et al. | 180/219 |
| 5,601,205 A | | 2/1997 | Prechtel et al. | |
| 5,996,717 A | * | 12/1999 | Hisadomi | 180/182 |
| 6,099,042 A | | 8/2000 | Cook et al. | |
| 6,213,514 B1 | * | 4/2001 | Natsume et al. | 280/833 |
| 6,604,594 B2 | * | 8/2003 | Wubbolts et al. | 180/186 |
| 6,651,764 B2 | * | 11/2003 | Fournier et al. | 180/190 |

* cited by examiner

Primary Examiner—Lesley D. Morris
Assistant Examiner—Daniel Yeagley
(74) Attorney, Agent, or Firm—Merchant & Gould, P.C.

(57) ABSTRACT

A fuel tank for a recreational vehicle such as a snowmobile is described. The fuel tank includes a fuel tank main body, side wings, and an upper steering post mount. The side wings provide support for mounting components of a vehicle thereto. The side wings extend outward from the fuel tank main body and are in fluid communication with the fuel tank reservoir of the main body. Additionally, the side wings extend downward creating a fuel pick-up recess area and a reserve. The fuel pick-up recess area and reserve independently create a toe hold or a footrest on an outer surface of the side wings. A snowmobile including a fuel tank having side wings is also described.

72 Claims, 13 Drawing Sheets

FUEL TANK FOR A STRADDLE-MOUNTED VEHICLE

FIELD OF THE INVENTION

This invention relates to a fuel tank for use with a snowmobile vehicle and; more particularly, the invention relates to a fuel tank for use with a snowmobile having surfaces and side wings capable of mounting components of a vehicle thereto and that are in fluid communication with the fuel reservoir.

BACKGROUND OF THE INVENTION

Snowmobiles are a widely used means of transportation in snowy regions. They are especially popular for recreational purposes such as trail riding or racing. In general, a snowmobile includes a chassis (frame), an engine, a drive track, a seat, a hood, a belly pan, and a fuel tank.

Fuel tanks for snowmobiles are well known. A typical fuel tank for a snowmobile includes a fuel reservoir, an inlet port, a fuel line going from the tank to the engine, and a fuel gauge telling the rider how much fuel remains in the tank. FIGS. 7 and 8 show examples of two prior art fuel tanks. Generally, the fuel tank and other vehicle components are separately mounted to the vehicle. Individually mounting each and every component to the vehicle is time consuming and costly from a manufacturing standpoint.

SUMMARY OF THE INVENTION

The invention provides a fuel tank having surfaces and side wings capable of mounting vehicle components thereto and that are in fluid communication with the fuel reservoir.

In one embodiment of the present invention, a fuel tank for a straddle-mounted vehicle includes, but is not limited to, a fuel tank main body, side wings, and an upper steering post mount. The fuel tank main body holds the fuel tank reservoir and has at least one front seat mount. The side wings provide support for mounting components of a vehicle thereto. The side wings are hollow and are in fluid communication with the fuel tank reservoir of the main body.

In another embodiment of the present invention, the side wings extend downward from the fuel tank main body, creating a fuel pick-up recess area and reserve.

In a further embodiment of the present invention, the fuel pick-up recess area and the reserve form a toe hold or a foot rest in the side wings of the fuel tank.

In yet another embodiment of the present invention, a snowmobile includes, but is not limited to, a frame, an engine, a drive track, a seat, a hood, a belly pan, and a fuel tank having side wings. The side wings provide support for mounting components of a vehicle thereto and are in fluid communication with the fuel reservoir. The fuel tank also includes an upper steering post mount and a belly pan mount.

A variety of additional advantages of the invention will be set forth in the description which follows, and others will be apparent from the description. It is to be understood that both the foregoing material and the following detailed description are exemplary and explanatory only, and are not restrictive of the invention as claimed.

BRIEF DESCRIPTION OF THE DRAWINGS

The accompanying drawings, which are incorporated in and constitute a part of this specification, illustrate several aspects of the invention and together with the description, serve to explain the principles of the invention. A brief description of the drawings is as follows.

DETAILED DESCRIPTION OF THE INVENTION

Reference will now be made in detail to exemplary aspects of the present invention that are illustrated in the accompanying drawings. Wherever possible, the same reference numbers will be used throughout the drawings to refer to the same or like parts. It should be noted that throughout the description, the terms "including", "containing", and "having" are used synonymously with "comprising".

Figure 5A:
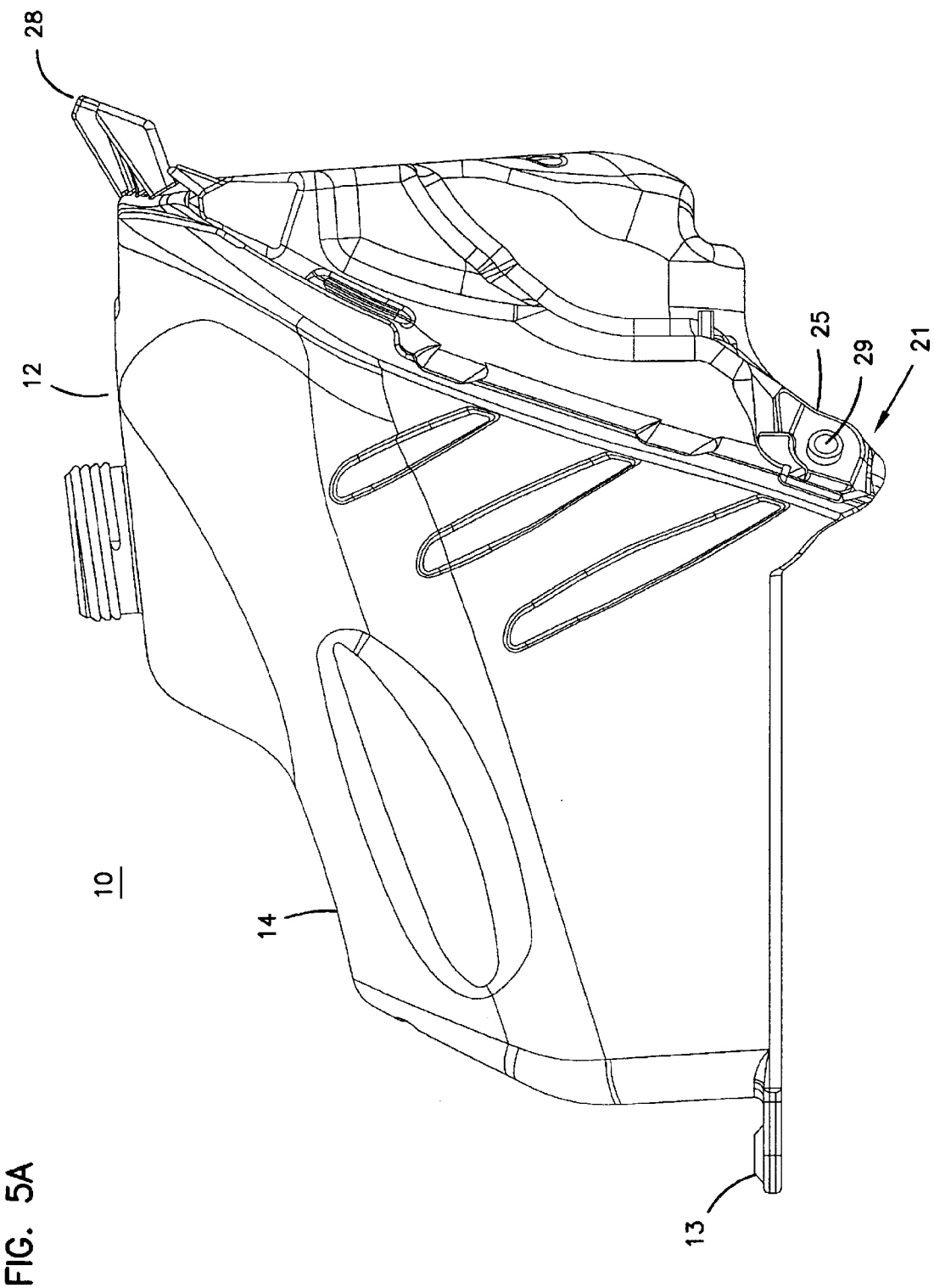
FIG. 5A is a right side view of the fuel tank depicted in FIG. 4A.
Figure 5B:
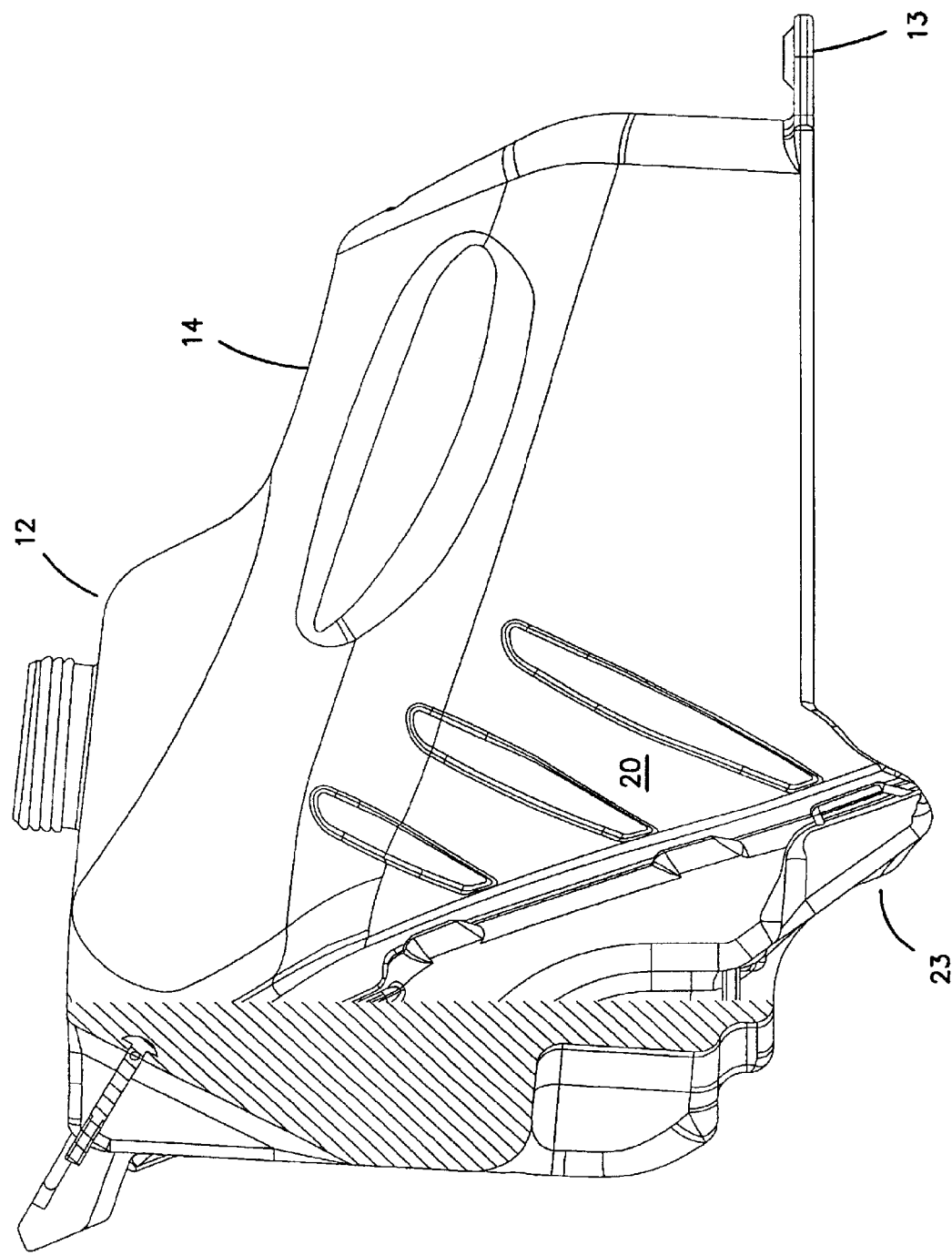
FIG. 5B is a left side view of the fuel tank depicted in FIG. 4A.
Figure 6:
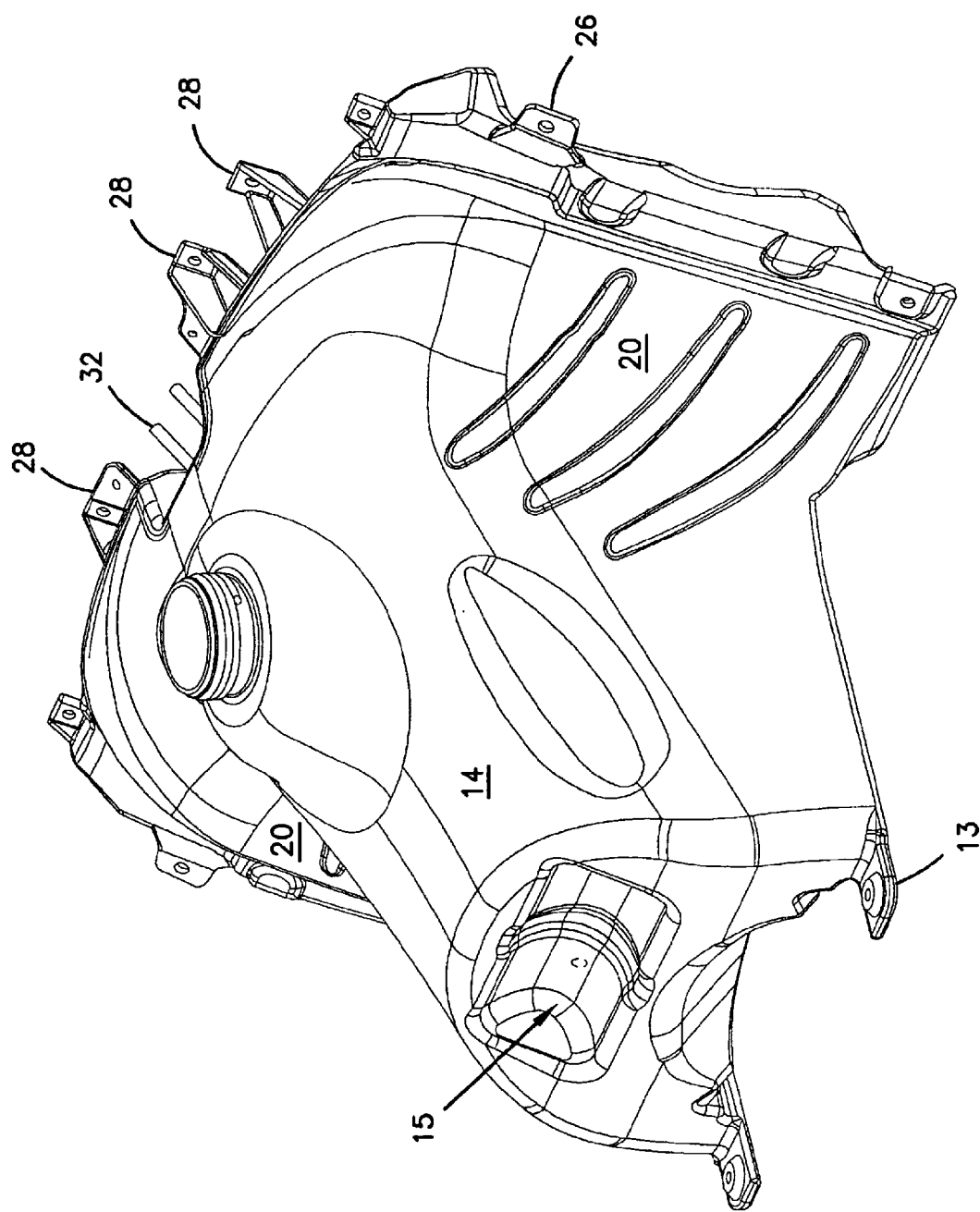
FIG. 6 is a perspective rear view of a fuel tank according to an embodiment of the present invention.
Figure 7:
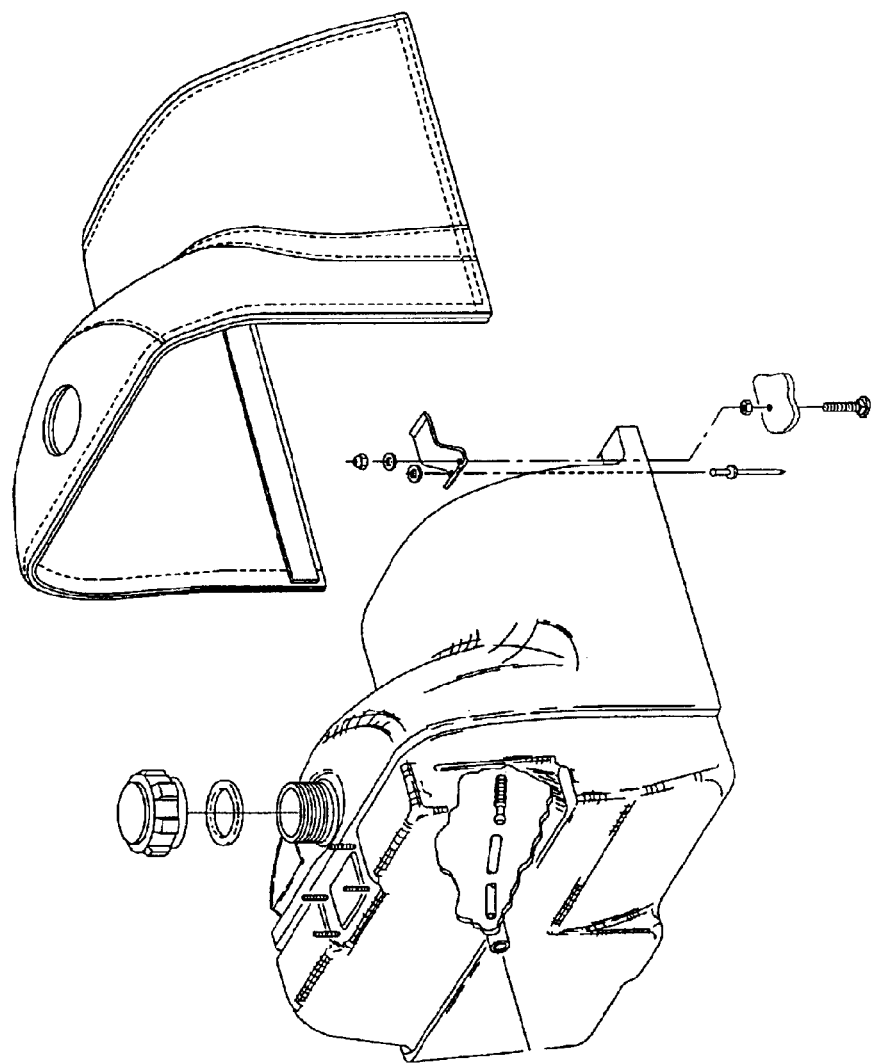
FIG. 7 shows a fuel tank of the prior art.
Figure 8:
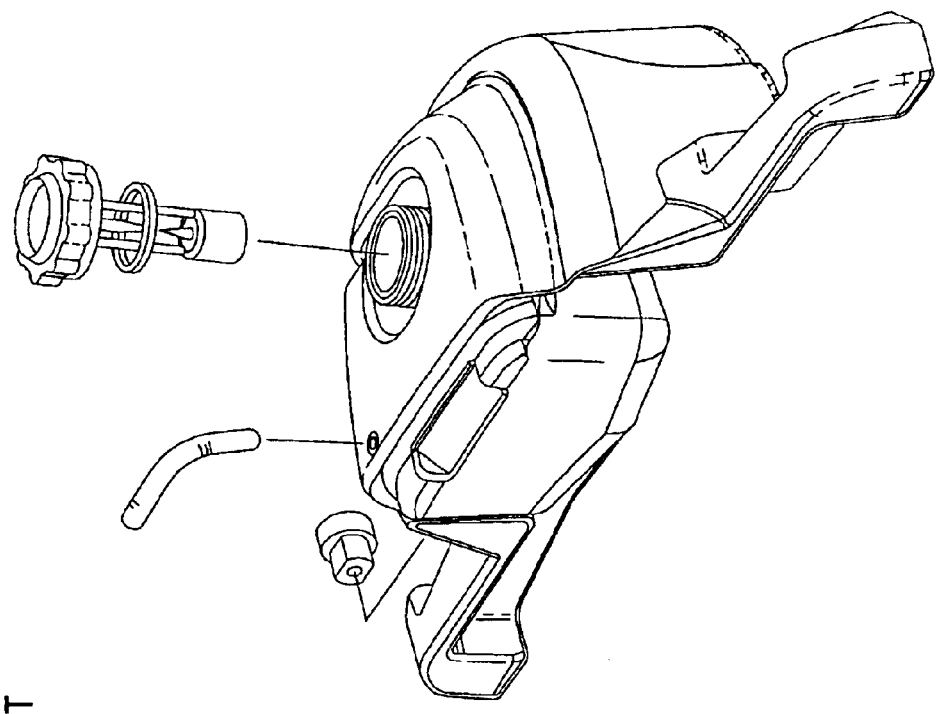
FIG. 8 shows a fuel tank of the prior art.

Referring now to the drawings, FIGS. 1–6 depict a fuel tank 10 for a straddle-mounted vehicle according to embodiments of the present invention. The fuel tank 10 as illustrated is intended for use with a snowmobile. As best viewed in FIG. 1, the fuel tank 10 includes a fuel tank main body 12 having a fuel reservoir 14 for storing fuel therein and a front seat mount 16 for mounting the front of the seat of the straddle mounted vehicle to the fuel tank. The fuel tank main body 12 also has at least one bracket 13 for securing the fuel tank to a vehicle. In an alternate embodiment, as best seen in FIGS. 3B and 6, the fuel tank main body 12 may also include a tool box recess 15 (also referred to as a tool kit recess) for storing a rider's tools during transit.

The fuel tank 10 may be manufactured from a single piece of material using a blow molding process. As an alternative, a roto-casting process may be employed. The material used in the manufacturing of the fuel tank 10 may be a plastic, such as high-density polyethylene. Other suitable plastics may also be used. The fuel tank 10 may be made of a multiplayer material if desired.

The fuel tank 10 also includes side wings 20 extending outward from the sides of the fuel tank main body 12. The side wings 20 are integrally formed with the fuel tank main body 12. By "integrally formed" it is meant that the side wings 20 and the fuel tank main body 12 are manufactured as a single structure from the same piece of material. The side wings 20 are hollow and provide fuel storage that is in fluid communication with the fuel reservoir 14 of the fuel tank main body 12.

The side wings 20 provide surfaces and support for vehicle components to be mounted thereto. As such, the side wings 20 should have a vertical height sufficient to mount all the desired components thereto and close the gap between the tank body, hood, and belly pan.

As illustrated in FIGS. 1, 2B, and 4A–4B, a mounting flange 22 may be formed along a peripheral edge of the side wings 20. The mounting flange 22 may have at least one console mount 24 and at least one belly pan mount 26. Additionally, the mounting flange has at least one multi-purpose mounting member 28. The multipurpose mounting member 28 may be a combined console and recoil handle mount for a pull-start engine. Alternatively, at least one of the console mount 24, belly pan mount 26, or multi-purpose mounting member may be formed on a surface or an edge of a side wing 20. The mounting flange may also comprise a recoil handle mount.

Figure 1:
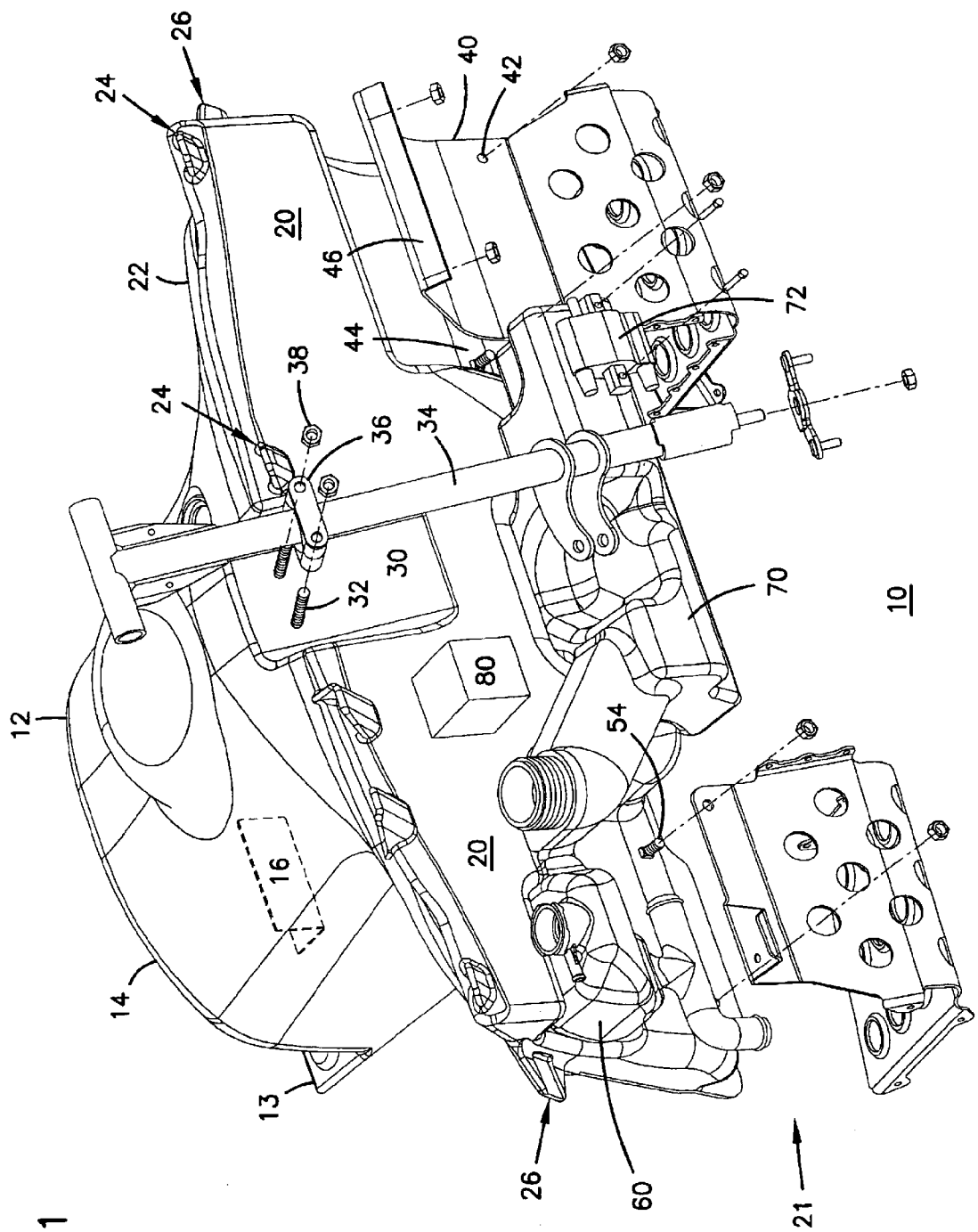
FIG. 1 is an exploded view of one possible embodiment of the present invention.
Figure 2A:
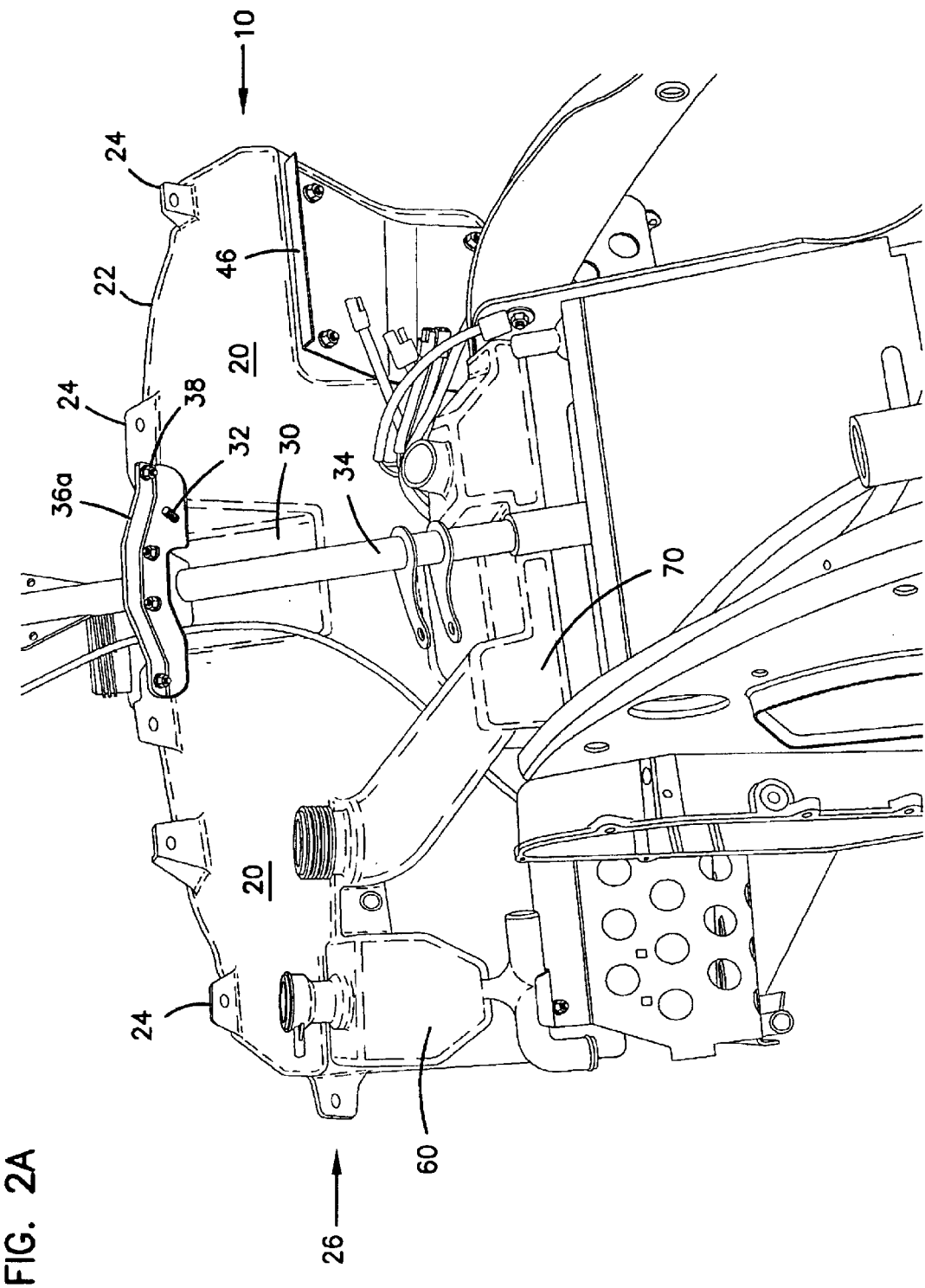
FIG. 2A is a front schematic view of an embodiment according to an embodiment of the present invention.
Figure 2B:
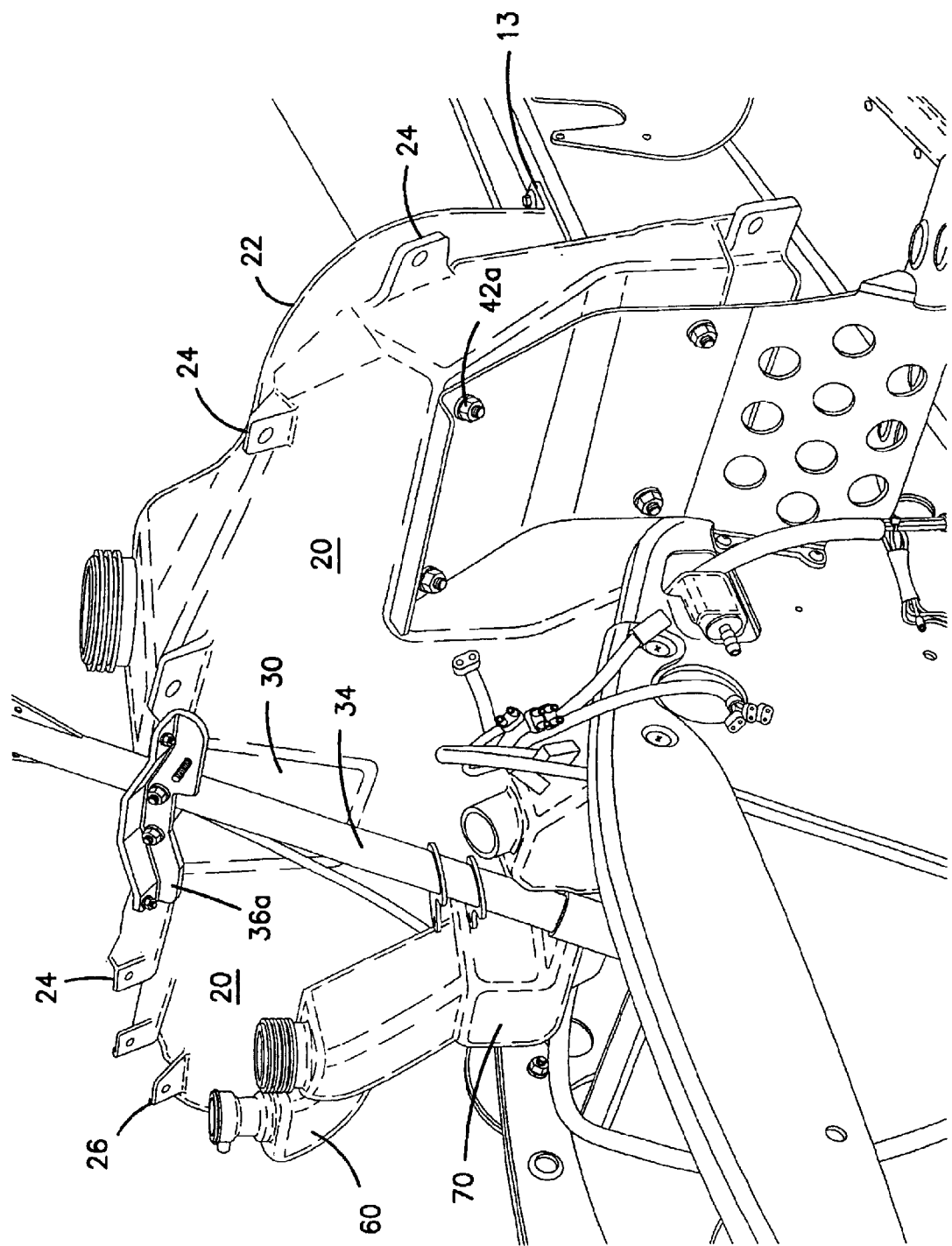
FIG. 2B is an oblique schematic view of the fuel tank depicted in according to an embodiment of the present invention shown in FIG. 2 mounted to a snowmobile.
Figure 2C:
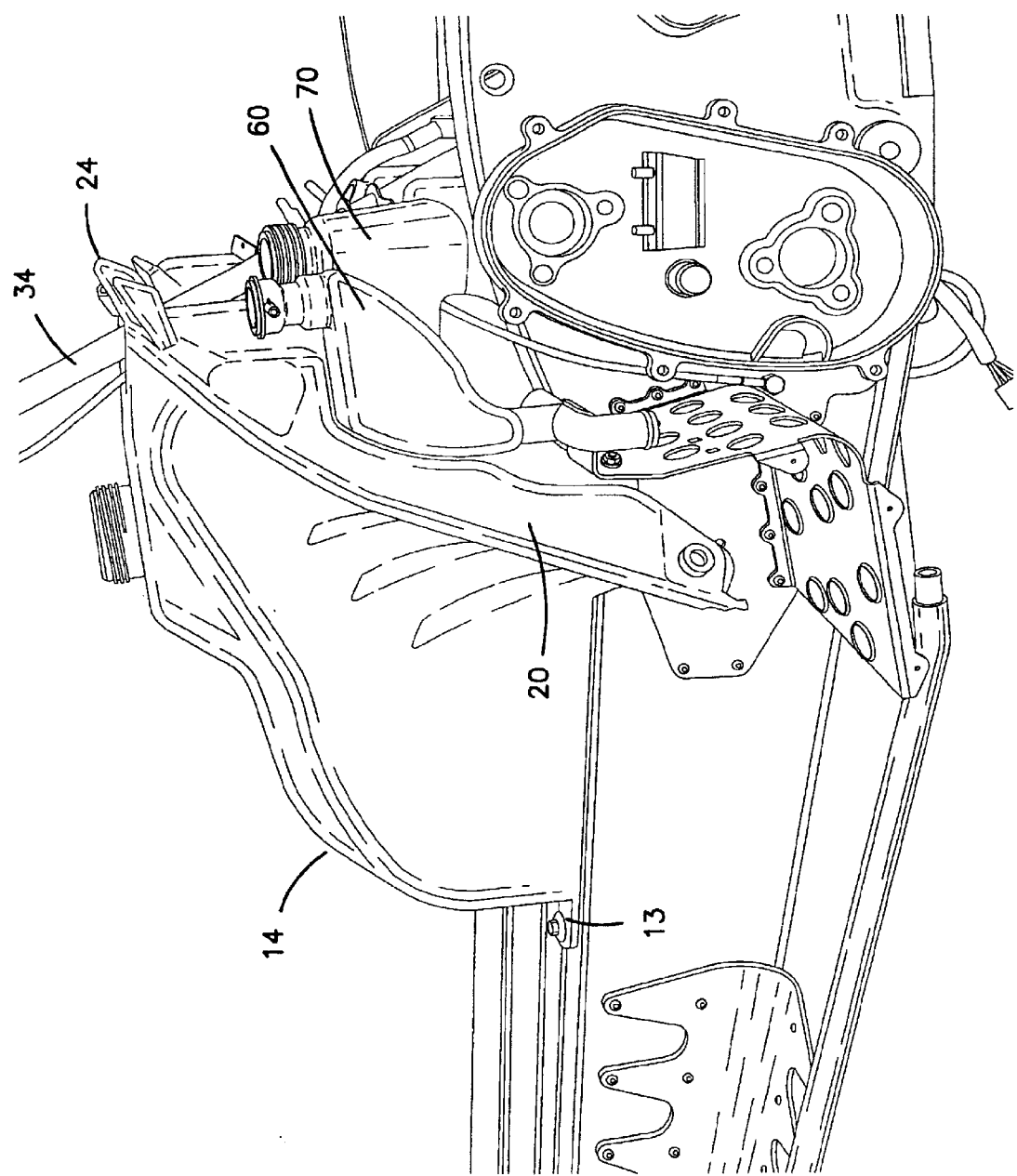
FIG. 2C is a right side schematic view of the fuel tank according to an embodiment of the present invention shown in FIG. 2 mounted to a snowmobile.

An upper steering post mount 30 that includes mounting posts 32 may be located between the side wings 20. As depicted in FIGS. 1 and 2–2B, a steering post 34 may be mounted in a depression formed at a centralized location between the side wings 20. Alternatively, the mounting location for the steering post 34 can be convex or flat depending on the requirements of the snowmobile design. The steering post 34 may be mounted to the upper steering post mount 30 by placing the steering post 34 between the mounting posts 32 and securing the steering post 34 to the upper steering post mount 30 using an appropriate securing means. By way of non-limiting example, the securing means may include a bracket 36, 36a that is slipped over the mounting posts and held in place via nuts 38. FIGS. 1 and 2A depict two different types of brackets that may be used in conjunction with the present invention.

In general, the side wings 20 help for a snowmobile to be more balanced about the track drive shaft, providing the rider with easy handling and control of the vehicle. The snowmobile rider is better able to execute turns while at the same time retaining comfortable control of the vehicle. Additionally, the side wings 20 allow the vehicle to carry the fuel in a centralized location while at the same time accommodating a larger fuel capacity. This feature allows the vehicle to carry more fuel while at the same time having a narrower track, resulting in a light-weight vehicle.

The side wings 20 also act as a sound barrier for the rider. The construction of the side wings 20 and the fluid in the side wings 20 work together to create a dampening effect. Additionally, when the side wings 20 do not include air vents, sound is not directed back at the rider, making for a more enjoyable ride.

Another feature of the side wings 20 is that they can serve as an additional fuel reserve. The side wings 20 extend downward from the fuel tank main body 12, creating a fuel pick-up recess area 21 and reserve 23 as they sit slightly lower than the well 11 of the fuel tank reservoir 14 (best shown in FIGS. 4A–B). One side wing 20 may serve as the fuel pick-up recess area 21 and the other side wing 20 may serve as the reserve 23. As fuel is consumed, the level of fuel in the fuel tank reservoir 14 located in the fuel tank main body 12 is lowered. When the fuel tank reservoir 14 is emptied, fuel is still left in at least one side wing 20. This features allows the rider to get additional fuel from the tank by rocking the vehicle such that the fuel is transferred from the reserve 23 in a side wing 20 to the portion of the fuel tank having the fuel line (not shown) and pick-up 29, enabling the rider to have a longer ride, or additional fuel to reach the destination or a refueling station.

Figure 4A:
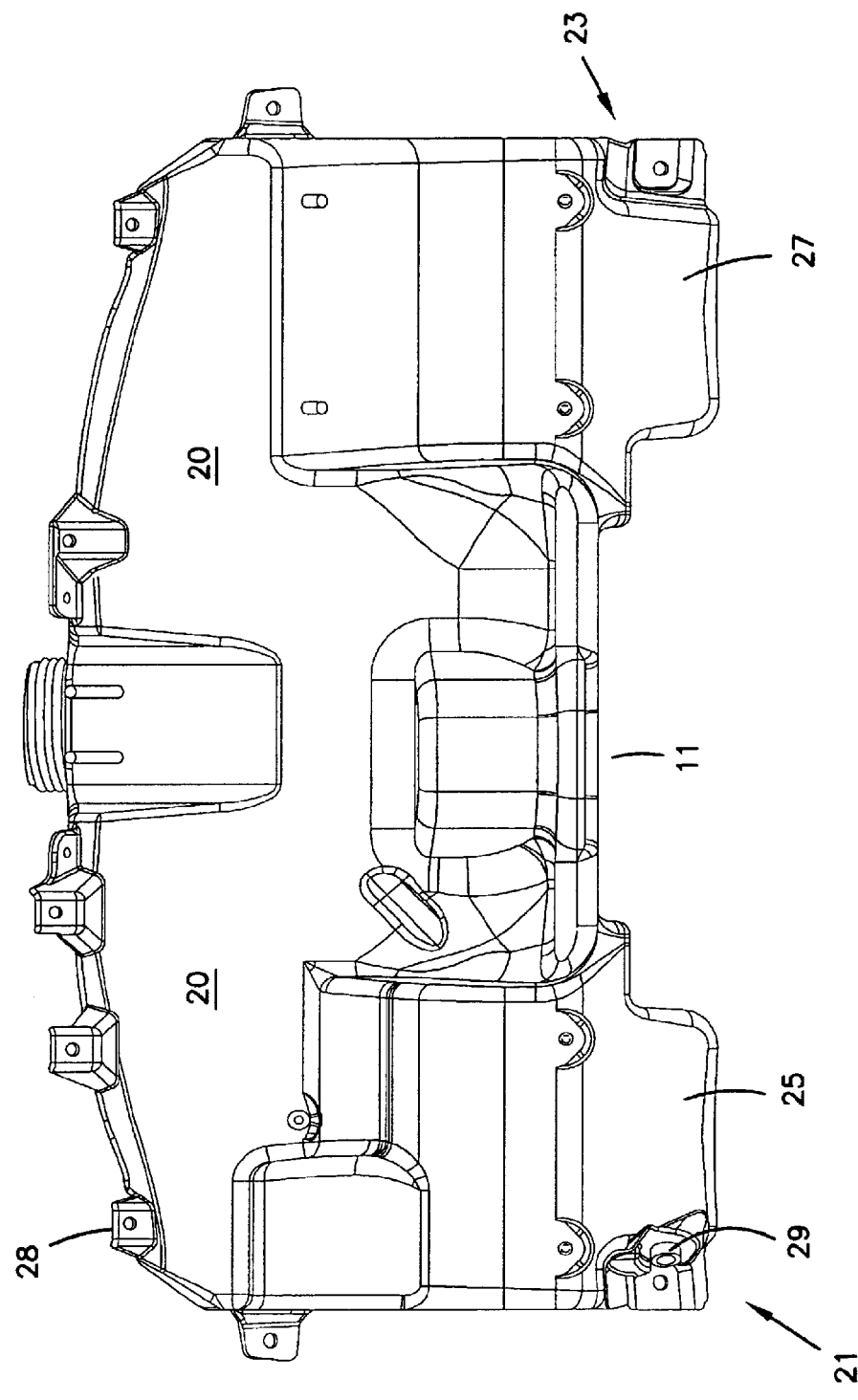
FIG. 4A is a front schematic view of an embodiment the present invention.
Figure 4B:
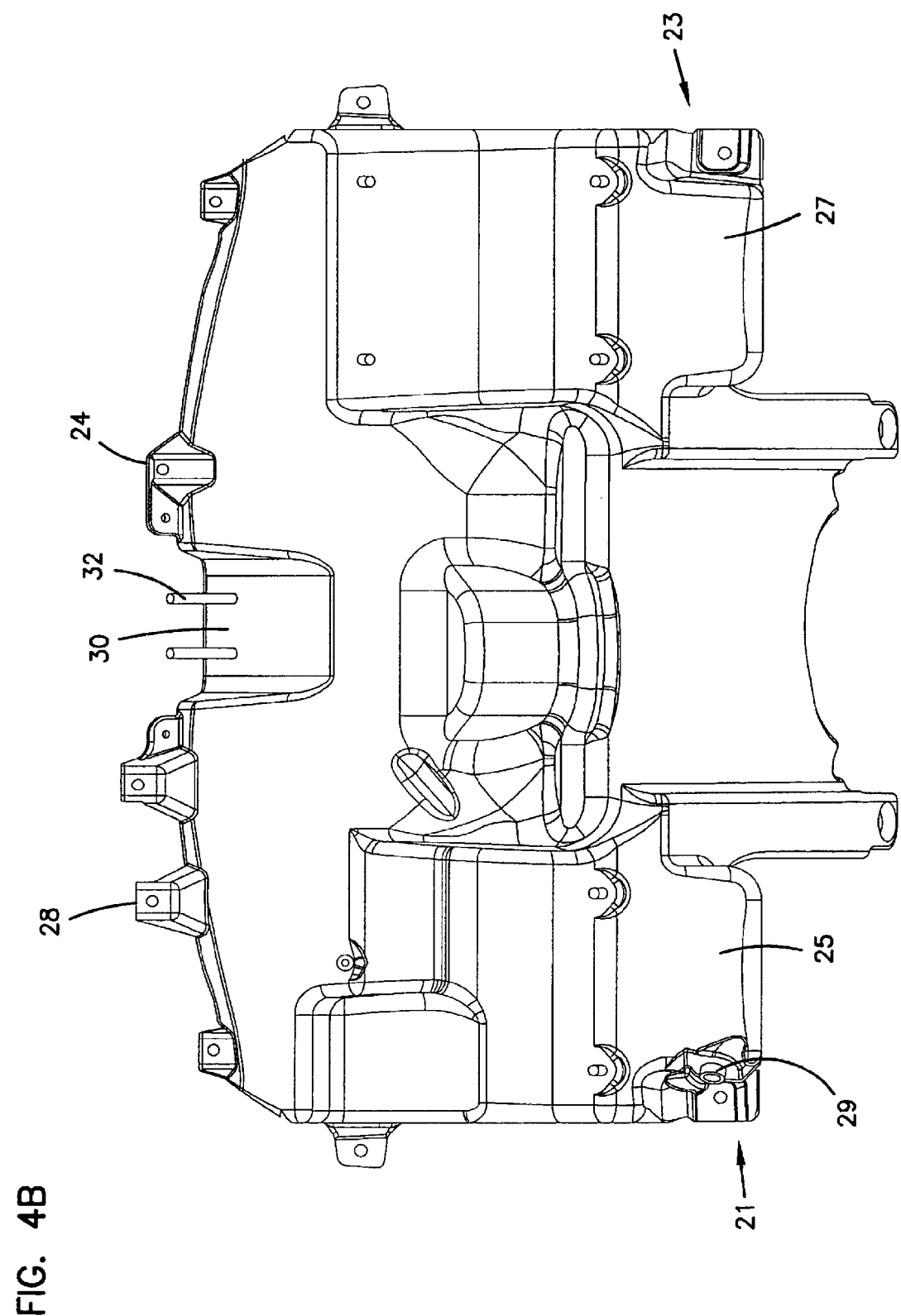
FIG. 4B is a rotated frontal view of the fuel tank depicted in FIG. 4A.

Additionally, as best shown in FIGS. 4A, 4B and 5A, the fuel pick-up recess area 21 and reserve 23 in the side wings 20 form a toehold 25 or foot rest 27 on outer surfaces of the side wings. This eliminates the need for a separately mounted toe hold or foot rest.

As depicted in FIGS. 4A–4B a combined foot rest and clutch guard 40 may be mounted to a side wing 20. As an alternative, the foot rest and clutch guard may be mounted to the side wings 20 as separate elements. The foot rest and clutch guard, either mounted as a combined unit or separately mounted elements may be aluminum or another metal, alloy, plastic, carbon fiber, or any other suitable material. If the foot rest and clutch guard are mounted as separate elements, they may be of two different materials. Also, visible in FIGS. 4A–4B are the multipurpose mounting members 28, the belly pan mounts 26, and the console mount 24. The multipurpose mounting members 28, belly pan mounts 26 and console mount 24 may be formed along a peripheral edge of the side wings 20 and may accommodate any suitable fastener.

As seen in FIGS. 4A and 4B, the combined footrest and clutch guard 40 may be provided with at least one aperture 42 for engaging at least one stud 44, which may be integrally molded with the side wing 20 (best viewed in FIG. 1). As seen in FIG. 4A, the combined footrest and clutch guard 40 also may comprise at least one fastening flange 46. The fastening flanges 46 may be formed along an upper edge of the combined footrest and clutch guard 40 and may comprise at least one bolt hole.

Also depicted in FIGS. 4A–4B is a footrest 50, which may be mounted to a side wing 20. The footrest may have at least one aperture 52 for engaging at least one stud 54 integrally molded with the side wing 20, as shown in FIG. 1. The footrest 50 may be made from any suitable metal including, but not limited to, aluminum or another metal, alloy, plastic, and carbon fiber. The footrest 50 is not required to be made from the same material as the combined footrest and clutch guard 40. Alternatively, as shown in FIG. 1, the footrest 50 may comprise a fastening flange 56. The fastening flange 56, depicted in FIG. 1, comprises at least one bolt hole 58. The footrests can be secured to the respective studs with nuts 42a and 58a, for example.

FIGS. 4A and 4B illustrate the side wings 20 extending downward from the fuel tank main body 12, creating the fuel pick-up recess area 21 and reserve 23. The fuel pick-up recess area 21 includes a fuel pick-up 29. Also shown in FIGS. 4A and 4B are toe hold 25 and foot rest 27 created by the fuel pick-up recess area 21 and reserve 23, respectively. The toehold 25 may created by either the fuel pick-up recess area 21 or the reserve 23. Similarly, the footrest 27 may be created by either the fuel pick-up recess area 21 or the reserve 23.

As depicted in FIG. 1, other vehicle components may be mounted to the fuel tank 10 via the side wings 20. These vehicle components include, but are not limited to, the following: a coolant tank 60; an oil tank 70; and a fuel pump 80. The oil tank may have an engine coil 72 mounted thereto as shown in FIG. 1.

In alternative embodiments of the present invention, the fuel tank 10 comprises additional vehicle components are mounted thereto. In general, the additional vehicle components are mounted to the side wings 20. These components include, but are not limited to, the following: a console, a belly pan, an engine coil, an ignition keyhole, a CDI box, an overflow, and a gauge, such as a fuel level gauge or a n oil pressure gauge. In an alternate embodiment, the console may be molded to the fuel tank.

The ignition keyhole may be formed in the side wings 20 of the fuel tank 10. Alternatively, the ignition keyhole may be formed in the console that is mounted to the fuel tank 10 via the side wings 20.

Additionally a gauge, such as a fuel level gauge or an oil pressure gauge, may be mounted to the fuel tank 10. Typically, a gauge is mounted to the side wings 20 in such a manner that the rider is afforded an easy view. In an alternative embodiment, a gauge, such as a fuel level gauge or an oil pressure gauge, may be molded into the fuel tank 10. Usually, the gauge is molded into the side wings 20 or the flange 22.

Figure 3A:
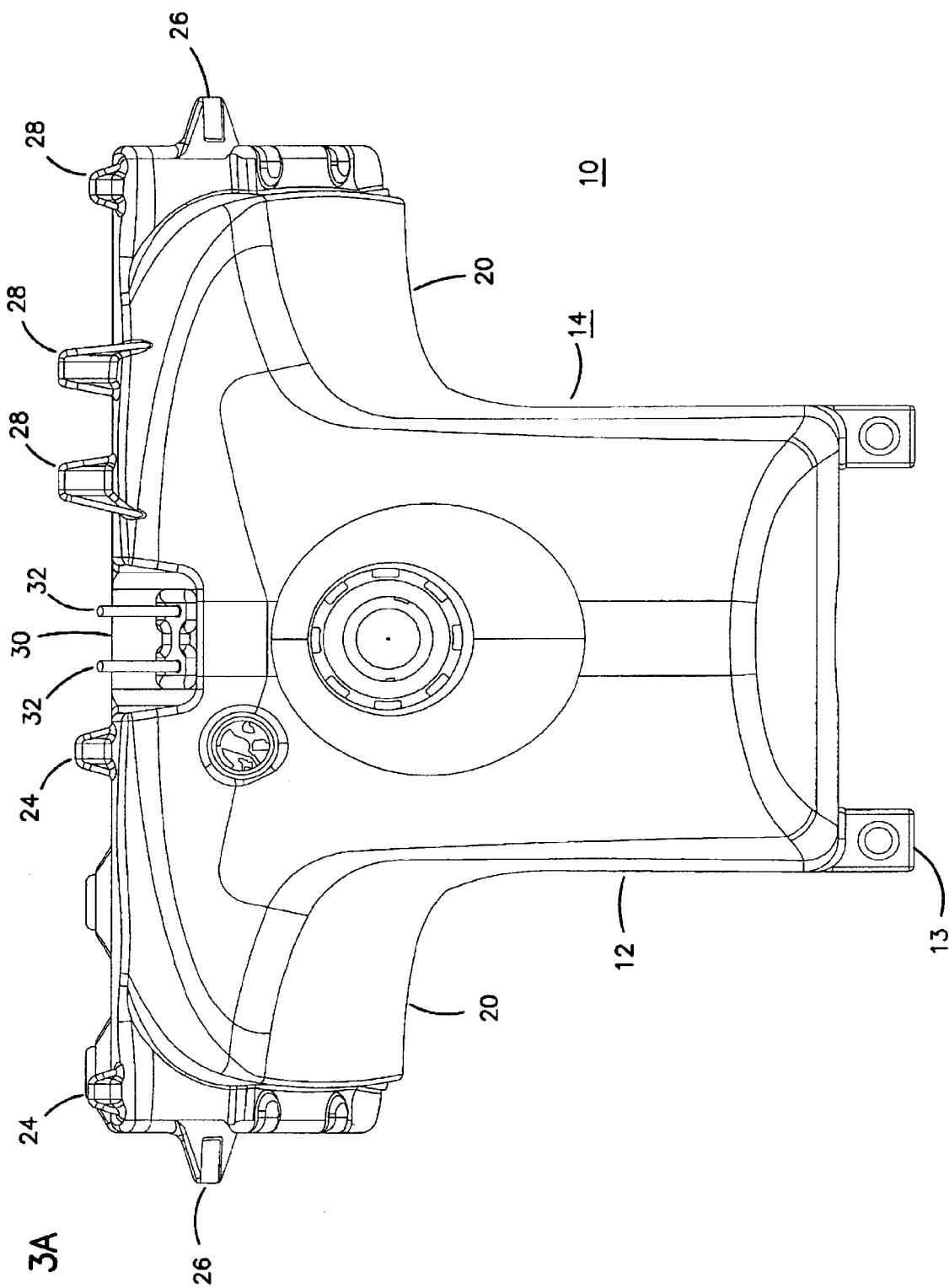
FIG. 3A is a top schematic view of a fuel tank according to an embodiment of the present invention.
Figure 3B:
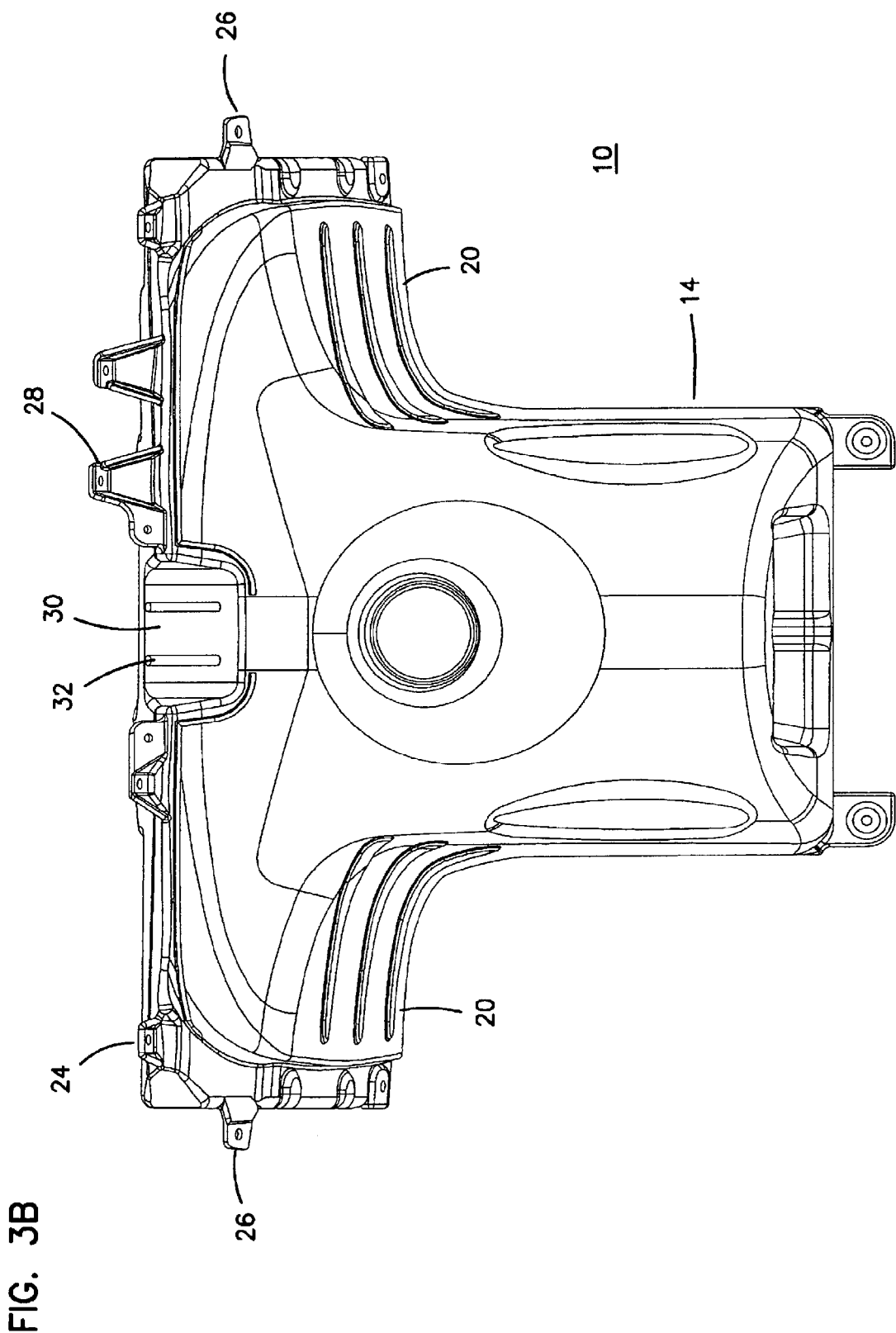
FIG. 3B is a top schematic view of a fuel tank according to an alternate embodiment of the present invention.

FIGS. 3A and 3B show top views of the fuel tank for a straddle-mounted vehicle 10. Visible in FIGS. 3A and 3B are the console mounts 24, the belly pan mounts 26, and the multipurpose mounting members 28, also referred to as the combined console and recoil handle mounts. FIGS. 3A and 3B depict the upper steering post mount 30 having mounting posts 32 located in a depression formed between the side wings 20. Also depicted is at least one bracket 13 for securing the fuel tank to the frame of a vehicle, particularly to the frame a snowmobile.

FIGS. 5A and 5B are side views of the fuel tank depicted in FIGS. 4B and 4C. FIGS. 5A and 5B show that the fuel tank main body 12 is contoured such that the main body has upper and lower portions. The lower portion extends towards the rear of the snowmobile and meets with the seat of the vehicle, e.g. a snowmobile (not shown). While this particular configuration for the fuel tank main body 12 is preferred, any shape or contour that is suitable for use with the intended vehicle can be selected. Also visible in FIG. 5A is the fuel pick-up recess area 21. The recessed area formed in the side wing as a result of the fuel pick-up recess area 21 may serve as a toe hold 25 (shown) or a footrest (not shown). Depicted in FIG. 5B is the fuel reserve 23.

It is to be understood that while certain embodiments of the present invention have been illustrated and described, the invention is not limited to the specific forms or arrangements of the parts described and shown, and that the specification and depicted embodiment is to be considered exemplary only, with the true scope and spirit of the invention being indicated by the broad meaning of the following claims.

I claim:

1. A fuel tank for a snowmobile, comprising:
   (A) a fuel tank main body, the fuel tank main body comprising a fuel reservoir and a front seat mount;
   (B) side wings, the side wings providing support for mounting components of a vehicle thereto, the side wings being hollow and in fluid communication with the fuel reservoir of the main body; and
   (C) an upper steering post mount.

2. The fuel tank according to claim 1, wherein a side wing extends downward from the fuel tank main body creating a fuel pick-up recess area.

3. The fuel tank according to claim 1, wherein a side wing extends downward from the fuel tank main body creating a reserve.

4. The fuel tank according to claim 2, wherein the fuel pick-up recess area forms a toe hold located in the side wing.

5. The fuel tank according to claim 3, wherein the reserve forms a footrest located in the side wing.

6. The fuel tank according to claim 2, wherein the fuel pick-up recess area forms a footrest located in the side wing.

7. The fuel tank according to claim 3, wherein the reserve forms a toe hold located in the side wing.

8. The fuel tank according to claim 1, wherein the fuel tank main body further comprises a tool box recess.

9. The fuel tank according to claim 1, wherein the fuel tank main body and side wings are of a single-molded construction.

10. The fuel tank according to claim 9, wherein the fuel tank is made from a plastic.

11. The fuel tank according to claim 1, wherein the upper steering post mount comprises mounting posts.

12. The fuel tank according to claim 1, wherein the side wings extend outward from the fuel tank main body.

13. The fuel tank according to claim 1, wherein the side wings further comprise a mounting flange formed along a peripheral edge of the side wings.

14. The fuel tank according to claim 13, wherein the mounting flange comprises at least one console mount.

15. The fuel tank according to claim 1, wherein the side wings further comprise at least one console mount.

16. The fuel tank according to claim 13, wherein the mounting flange comprises at least one multi-purpose mounting member.

17. The fuel tank according to claim 16, wherein the multi-purpose mounting member comprises a combined console and recoil handle mount.

18. The fuel tank according to claim 1, wherein the fuel tank further comprises at least one belly pan mount.

19. The fuel tank according to claim 13, wherein the mounting flange further comprises at least one belly pan mount.

20. The fuel tank according to claim 1, further comprising a footrest and a clutch guard mounted to the fuel tank.

21. The fuel tank according to claim 20, wherein the footrest and clutch guard are mounted to the side wings.

22. The fuel tank according to claim 1, further comprising a combined footrest and clutch guard mounted to the fuel tank.

23. The fuel tank according to claim 22, wherein the combined footrest and clutch guard is mounted to the side wings.

24. The fuel tank according to claim 20, wherein the footrest comprises at least one aperture, the at least one aperture engaging at least one stud on the side wings.

25. The fuel tank according to claim 24, wherein the footrest further comprises at least one fastening flange.

26. The fuel tank according to claim 22, wherein the combined footrest and clutch guard comprises:
    at least one aperture, the aperture engaging at least one stud on the side wings.

27. The fuel tank according to claim 26, wherein the combined footrest and clutch guard further comprises at least one fastening flange.

28. The fuel tank according to claim 20, wherein the footrest and the clutch guard are each independently made from a material selected from metal, alloy, plastic, and carbon fiber.

29. The fuel tank according to claim 28, wherein the footrest is aluminum.

30. The fuel tank according to claim 28, wherein the clutch guard is aluminum.

31. The fuel tank according to claim 22, wherein the combined footrest and clutch guard is made from a material selected from metal, alloy, plastic, and carbon fiber.

32. The fuel tank according to claim 31, wherein the combined footrest and clutch guard is aluminum.

33. The fuel tank according to claim 1, further comprising a steering post mounted to the fuel tank.

34. The fuel tank according to claim 33, wherein the steering post is secured to the upper steering post mount.

35. The fuel tank according to claim 1, further comprising a console mounted to the fuel tank.

36. The fuel tank according to claim 1, further comprising a console molded to the fuel tank.

37. The fuel tank according to claim 35, wherein the console is mounted to the side wings.

38. The fuel tank according to claim 1, further comprising a belly pan mounted to the fuel tank.

39. The fuel tank according to claim 38, wherein the belly pan is mounted to the side wings.

40. The fuel tank according to claim 1, further comprising a coolant tank mounted to the fuel tank.

41. The fuel tank according to claim 40, wherein the coolant tank is mounted to the side wings.

42. The fuel tank according to claim 1, further comprising an oil tank mounted to the fuel tank.

43. The fuel tank according to claim 42, wherein the oil tank is mounted to the side wings.

44. The fuel tank according to claim 43, further comprising a coil mounted to the oil tank.

45. The fuel tank according to claim 1, further comprising an engine coil mounted to the fuel tank.

46. The fuel tank according to claim 45, wherein the engine coil is mounted to the side wings.

47. The fuel tank according to claim 1, further comprising an ignition keyhole formed in the fuel tank.

48. The fuel tank according to claim 47, wherein the ignition keyhole is formed in the side wings.

49. The fuel tank according to claim 1, further comprising a recoil handle mount mounted to the fuel tank.

50. The fuel tank according to claim 49, wherein the recoil handle mount is mounted to the side wings.

51. The fuel tank according to claim 1, further comprising a CDI box mounted to the fuel tank.

52. The fuel tank according to claim 51, wherein the CDI box is mounted to the side wings.

53. The fuel tank according to claim 1, further comprising a coolant tank mounted to the fuel tank.

54. The fuel tank according to claim 53, wherein the coolant tank is mounted to the side wings.

55. The fuel tank according to claim 1, further comprising a gauge mounted to the fuel tank.

56. The fuel tank according to claim 1, further comprising a gauge molded into the fuel tank.

57. The fuel tank according to claim 55, wherein the gauge is mounted to the side wings.

58. The fuel tank according to claim 56, wherein the gauge is molded into the side wings.

59. The fuel tank according to claim 13, further comprising a gauge molded into the flange.

60. The fuel tank according to claim 1, further comprising a fuel pump mounted to the fuel tank.

61. The fuel tank according to claim 60, wherein the fuel pump is mounted to the side wings.

62. The fuel tank according to claim 1, further comprising an ignition keyhole formed in a console, the console being mounted to the fuel tank.

63. The fuel tank according to claim 62, wherein the console is mounted to the side wings.

64. The fuel tank according to claim 1, wherein the vehicle is a snowmobile.

65. A snowmobile comprising a frame, an engine, a drive track, a seat, a hood, a belly pan and a fuel tank mounted to said snowmobile, the fuel tank comprising:
   (A) a fuel tank main body, wherein the fuel tank comprises a fuel reservoir and a front seat mount;
   (B) side wings, the side wings providing support for mounting components of a vehicle thereto, the side wings being hollow and in fluid communication with the fuel reservoir of the main body; and
   (C) an upper steering post mount.

66. The snowmobile according to claim 65, wherein the fuel tank main body further comprises a tool box recess.

67. A snowmobile according to claim 65, wherein a side wing extends downward from the fuel tank main body creating a fuel pick-up recess area.

68. A snowmobile according to claim 65, wherein a side wing extends downward from the fuel tank main body creating a reserve.

69. A snowmobile according to claim 68, wherein the fuel pick-up recess area creates a toe hold located on the side wing.

70. A snowmobile according to claim 67, wherein the fuel pick-up recess area creates a footrest located on the side wing.

71. A snowmobile according to claim 68, wherein the reserve creates a toe hold located on the side wing.

72. A snowmobile according to claim 68, wherein the reserve creates a foot rest located on the side wing.

* * * * *